United States Patent Office 3,131,148
Patented Apr. 28, 1964

3,131,148
THICKENED COMPOSITIONS
Thomas A. Taulli, Florissant, Mo., assignor to Monsanto Chemical Company, St. Louis, Mo., a corporation of Delaware
No Drawing. Filed Jan. 13, 1961, Ser. No. 82,399
17 Claims. (Cl. 252—28)

The present invention relates to organic liquids thickened with novel thickening agents. The present invention further relates to organic liquid compositions or formulations containing plastic or resinous substances, and thickened with small amounts of certain novel compounds, particularly certain amorphous metal-containing silica aerogels.

The desirability of thickening organic liquids for use in certain applications has been widely recognized, and it has been proposed heretofore to thicken a variety of such liquids by incorporating therein inert inorganic materials including mica, diatomaceous earth, talc, alumina, graphite and the like, and, in particular, silica aerogels. For example, it has been proposed, in U.S. Patent No. 2,260,625, issued to Samuel S. Kistler to thicken oily liquids, such as lubricating oils, and to convert such oils into greases by incorporating silica aerogels in amounts up to as high as 50% in such oils. Also, for example, it has been proposed in U.S. Patent No. 2,892,730, issued to Harry Kloepfer and Otto Schweitzer, to thicken organic liquids containing high molecular weight film formers, such as nitrocellulose, cellulose acetate, polyvinyl acetate, chlorinated rubber and the like dissolved in organic solvents, with oxides of silicon, aluminum and titanium, to prevent the settling of mineral fillers therefrom.

It has also been proposed in U.S. Patent No. 2,610,960, issued to Birger W. Nordlander, to thicken, and/or render thixotropic, coating and filling compositions such as polymerizable organic liquids consisting of liquid polyester resins by the incorporation of vermiculite in an amount as high as 50% by weight of the vermiculite in such liquids. It has also been proposed in U.S. Patent No. 2,387,461, issued to Eugene V. Horst, to render thixotropic, laminating compositions consisting of solid polyester resins dissolved in styrene by the incorporation of silica aerogel, such as the silica aerogel described in the aforesaid Kistler patent or mixtures of such silica aerogel and alumina in amounts as high as 20% by weight of such inorganic materials in the liquids. By thickening and/or rendering such liquids thixotropic, it has been possible to overcome the problem of drainage of such compositions away from the coated or filled objects to which the composition has been applied.

However, the above-described thickening agents possess certain disadvantages, in that relatively large amounts of such materials are required to significantly thicken or increase the viscosity of organic liquids and/or render these liquids capable of forming thixotropic gels. Thus, for example, the thickening agents when used in large quantities, in some instances, adversely affect the properties of such organic liquids or the use thereof, while in other instances, the cost of these thickening agents renders their use, in the large quantities normally required, economically prohibitive. Although silica aerogels of the type described in the aforementioned Kistler patent have been widely used as thickening agents, the utility of these materials is limited, particularly where it is desired to thicken polymerizable organic liquids, such as polyesters and epoxide resins, prior to the curing of these materials. In using these liquid resins, the polymerizable polyesters or solutions thereof are applied as filling and coating compositions as desired, following which the curing of the resin is caused to take place. One of the problems encountered in applying liquid resins, for example in the fabrication of laminates such as fibre glass, is the tendency of the liquid to flow or drain away from the surface to which it is applied when such surface is not disposed in the horizontal plane as is frequently the case. Thus, it has been necessary to incorporate relatively large amounts, e.g., up to 16% by weight, of the above-described silica aerogels in such polymerizable liquids to obtain thickening and prevent drainage, although it is known that amounts in excess of 5% by weight of silica aerogels in such liquids usually adversely affect the properties of the polymers when cured. Generally stated, the silica aerogels of the type described in the aforementioned Kistler patent are relatively inefficient and uneconomical for use as thickening agents for organic liquids.

In accordance with the present invention it is possible to thicken organic liquids by incorporating in such liquids novel, amorphous metal-containing, silica aerogels which are unexpectedly efficient thickening agents and do not have the aforementioned disadvantages inherent in previously known silica aerogels of the kind defined by Kistler.

It is one object of the present invention to provide organic liquids thickened with novel thickening agents.

It is another object of this invention to provide compositions comprising organic liquid oily or lubricating substances thickened with relatively small amounts of certain novel metal-containing silica aerogels.

It is also an object of this invention to thicken organic liquids economically and/or without appreciably altering the useful properties of such liquids or the end products made therefrom.

It is a more particular object of the present invention to provide compositions comprising liquid resins thickened and/or made thixotropic by the incorporation therein of relatively small amounts of certain amorphous metal-containing silica aerogels and which are useful in a wide variety of commercial applications.

These and other objects and advantages of the present invention will become apparent from the following description and the appended claims.

The compositions of this invention comprise an organic liquid containing an amount, sufficient to thicken or increase the viscosity of such liquid, of a finely divided, amorphous, alkaline earth metal-containing silica aerogel, (hereinafter sometimes referred to as the novel aerogel) comprising a silica polymer having siloxy groups, a portion of which groups are chemically bound to an alkaline earth metal, preferably calcium or magnesium, the $SiO_2$ to alkaline earth metal ratio being between about 5:1 and about 66:1 or stated differently the polymer contains alkaline earth metal atoms chemically bound to from about 3% to about 40% of the siloxy groups in the aerogel, and preferably having an average particle size of between about 2 and about 4 microns. The amount of such novel aerogel employed may vary to some extent depending on the particular aerogel and organic liquid used, on the end use of the thickened composition and the degree of thickening required, but in general is from about 0.5 to 5.0% by weight of the composition.

Any of a wide variety of organic liquids may be employed in such compositions but it is preferable to employ organic liquids, which are liquid in the range of about −10° C. to about 100° C., more desirably in the range of 0° C. to 70° C. at atmospheric pressure. Further it is desirable to employ organic liquids having a viscosity in the range of from about 2.5 millipoises to about 3000 centipoises at a temperature of about 25° C.

The novel aerogels, that is, the novel, amorphous, alkaline earth metal-containing aerogels, employed desirably have a specific surface area in the range of from 10 to 200 square meters per gram, preferably from 50 to 175 square meters per gram, as measured by the method of Brunauer, Emmett and Teller described in "Advances in Colloid Science," volume I, pages 1–36 (1942), published by Inter-Science Publishers Inc., New York, N.Y. The magnitude of the specific surface area generally depends on the particular alkaline earth metal in the metal-containing silica aerogel, the amount of such alkaline earth metal in the aerogel and other factors. Thus, by way of example a calcium-containing silica aerogel having an $SiO_2$:Ca ratio of 66 molecules of $SiO_2$ for each atom of calcium, or stated differently having calcium atoms bonded to about 3% of the siloxy groups in the aerogel, generally has a specific surface area in the range of between 50 and 175 square meters per gram whereas an aerogel containing calcium in an $SiO_2$:Ca ratio of from 10–12 molecules of $SiO_2$ for each atom of calcium, or stated differently having calcium atoms bonded to about 16% to 20% of the siloxy groups in the aerogel, will generally have a specific surface area of between 40 and 65 square meters per gram. On the other hand, a magnesium containing aerogel having an $SiO_2$:Mg ratio of 13 molecules of $SiO_2$ for each atom of magnesium, or stated differently having magnesium atoms bonded to about 12% of the siloxy groups in the aerogel, will generally have a specific surface area of from 140 to 180 square meters per gram.

The novel finely divided aerogels which are preferably employed in the compositions of this invention have an external surface area in the range of about 0.7 to about 1.8, preferably from 0.9 to 1.6, square meters per gram, depending upon the particle size of the particles of the aerogel and also depending upon the particular alkaline earth metal in the metal-containing aerogel and the amount of the alkaline earth metal atoms chemically bound to the siloxy groups in such aerogel. Thus, for example, an aerogel having a particle size of between 2 and 4 microns and containing magnesium in an $SiO_2$:Mg ratio of 13 molecules of $SiO_2$ for each atom of magnesium generally has an external surface area of about 0.9 square meters per gram, whereas an aerogel containing magnesium in an $SiO_2$:Mg ratio of about 5:1 usually has an external surface area of about 1.2 square meters per gram. On the other hand a calcium containing silica aerogel having an $SiO_2$:Ca ratio of 66 molecules of $SiO_2$ for each atom of calcium usually has an external surface area of about 1.05 square meters per gram.

The particles of the preferred amorphous, alkaline earth metal-containing silica aerogels usually have a particle size of 4 microns or less. The particle size distribution is preferably such that about 3% to 8% of the total particles are less than one micron in size, from 10% to 20% of the particles have a particle size of between 1 and 2 microns, from about 35% to 45% of the particles have a particle size of between 2 and 3 microns, and from 35% to 45% of the particles have a particle size in the range of from 3 to 4 microns. The particle size distribution is preferably such that about 5% of the total particles are less than 1 micron in size, about 15% of the particles have a particle size of between 2 and 3 microns and about 40% of the particles have a particle size in the range of from 3 to 4 microns. The particle size and external surface area measurements of the novel aerogels were determined by using the method described by J. H. L. Watson in volume 20, page 576 of "Analytical Chemistry," published in June, 1948.

As stated heretofore amorphous, calcium-containing and magnesium-containing silica aerogels are preferred aerogels for use in the compositions of this invention. Amorphous calcium-containing silica aerogels which are preferred are aerogels comprising a silica polymer having siloxy groups and which also contain calcium atoms chemically bound to from 9% to 28% of such siloxy groups. These aerogels also preferably have a specific surface area of from 50 to 175 square meters per gram and an external surface area of from 0.9 to 1.6, more preferably 1.1 to 1.3, square meters per gram, an average particle size of between 2 and 4 microns, more preferably between 2.5 and 3.5 microns, and further preferably have an $SiO_2$ to Ca ratio of from about 7 to about 22 molecules, more preferably from about 10 to about 12 molecules, of $SiO_2$ for each atom of calcium in the aerogel.

Amorphous magnesium-containing silica aerogels which are preferred are aerogels comprising a silica polymer having siloxy groups and which also contain magnesium atoms chemically bound to from about 12% to 26% of such siloxy groups. These magnesium-containing aerogels also preferably have a specific surface area of 10 to 200 square meters per gram, an external surface area of from 0.9 to 1.1 square meters per gram, an average particle size in the range of from about 3 to about 4 microns and further, preferably have an $SiO_2$ to Mg ratio of about 6 to about 13 molecules of $SiO_2$ per atom of magnesium in the aerogel.

The novel aerogels, that is, the above referred to amorphous, alkaline earth metal-containing silica aerogels, may be prepared by adding certain water-soluble alkaline earth metal, as, for example, calcium or magnesium, salts such as calcium or magnesium acetate to colloidal acidic silica hydro-organosols such as, for example the sols described in U.S. Patent No. 2,285,477 to John F. White, issued June 9, 1942, or the hydro-organosols described in U.S. Patent 2,845,449, issued to Morris D. Marshall. An alkaline earth metal-containing, silica hydro-organosol is thus formed having alkaline earth metal ions of the afore-mentioned metal salts contained therein. When these sols are allowed to stand or are heated they gel relatively rapidly. The resultant metal-containing gel is next heated in a pressure resistant vessel to convert the liquid phase to a vapor phase, and the vapor is then separated from the solids, without appreciable shrinkage in volume of the gel, the amorphous metal-containing silica aerogels comprising a silica polymer having siloxy groups and containing an alkaline earth metal chemically bound to a portion of such siloxy groups and having an $SiO_2$ to M ratio of from about 5:1 to about 66:1 where M is the alkaline earth metal. In converting the liquid phase of the gel to the vapor phase, it is essential that the gel should not be subjected to a substantial compressive liquid-solid interface until all of the liquid phase has been converted to a vapor phase.

After the alkaline earth metal-containing silica aerogels are formed they are usually comminuted or ground to produce amorphous metal-containing aerogels having an average particle size in the range of from about 2 to about 4 microns, a specific surface area of from 10 to 200 square meters per gram and an external surface area of from about 0.9 to 1.6 square meters per gram. After such aerogels are comminuted or ground it has been found generally desirable to heat such aerogels at a temperature in the range of from 500° C. to 650° C. preferably in the range of 550° C. to 590° C. It has been found that such heating further enhances the properties of such aerogels as agents for thickening organic liquid compositions.

These aerogels may be ground or comminuted in a variety of ways well-known to those skilled in the art. However, the grinding or comminuting is preferably carried out using an air grinding or air attrition mill, for example of the type illustrated in FIGURE 51 on page 1145 of Chemical Engineers Handbook (3rd edition), published by McGraw-Hill of New York, N.Y. The grinding or comminuting is also preferably carried out in an atmosphere of air at a pressure in the range of between 25 pounds per square inch and 90 pounds per square inch, depending upon the average particle size which may be desired. For example, when an average particle size of about 2 microns is desired, a higher air pressure, e.g., 90 pounds per square inch, may be used. On the other hand, where an average particle of about 4 microns is desired, an air pressure of about 25 pounds per square inch may be used.

As stated heretofore, the above described novel aerogels may be employed in compositions comprising any of a wide variety of organic liquids and when so employed will thicken and/or increase the viscosity of such liquids. Thus classes of organic liquids having a relatively low viscosity, e.g., in the range of from 2.5 to 25 millipoises at 25° C., can be employed in combination with the aforedescribed novel aerogels to provide compositions having a viscosity appreciably above 25 millipoises and up to 500 centipoises at this temperature. Such organic liquids may be organic solvents, for example, solvents used in paint, varnish or lacquer removers, and include liquids such as aliphatic and aromatic alcohols, ketones and esters, for example ethanol, acetone, methyl ethyl ketone, ethyl acetate, amyl acetate and the like.

Also classes of organic liquids having relatively higher viscosities, e.g., viscosities ranging from about 100 to 600 centipoises at 25° C., can be used in combination with the novel aerogels to provide compositions having viscosities of from 1000 to 8000 centipoises at 25° C. Such organic liquids include classes of oleaginous liquids such as oils of animal and vegetable origin, for example cod liver oil, olive oil, cottonseed oil, corn oil and the like. Also included are lubricating oils such as hydrocarbon motor oils and these may be employed in conjunction with the novel aerogels to provide gel-like bodies having a grease consistency.

In one embodiment of this invention, thin hydrocarbon lubricating oils such as motor oils having viscosities of between 90 and 110 centipoises may be thickened by the dispersion of from 0.5% to 1.5% by weight of the preferred, finely divided, amorphous calcium or magnesium-containing silica aerogels to provides compositions having viscosities of from 250 to 340 centipoises at 27° C. when the viscosity measurements are taken on a MacMichael viscosimeter with a number 26 wire. More specifically a composition containing a light motor oil (SAE No. 10) and 1.0% by weight of a calcium-containing silica aerogel generally has a viscosity of 290 centipoises at 27° C.

Other classes of organic liquids which may be thickened and/or rendered thixotropic include film-forming organic liquids such as liquids containing a dissolved organic film-forming or bonding solid or liquid which, on evaporation of such liquid or by polymerization during or after evaporation of such organic liquid forms films, coatings or a binder which is capable of bonding two similar (for example glass fibre) or two dissimilar materials with a relatively high strength bond.

A particularly useful embodiment of the present invention comprises organic thixotropic compositions comprising natural and/or synthetic polymer resins containing relatively small amounts of the aforedescribed finely divided amorphous, metal-containing silica aerogels.

The term "thixotropic" is used herein to denote the property of certain organic liquids, containing the novel aerogels, to thicken and to change rapidly on standing from a liquid into a gel-like solid mass or body having sufficient cohesive strength to withstand distortion by gravitational force when suspended freely in an inverted receptacle or on a coated object. The gel is also of such a nature that it can be fluidized by the application of mechanical agitation as by shaking, stirring, vibrating and the like. The property of thixotropy as understood herein is thus characterized by a reversible isothermal sol⇌gel transition.

It has presently been found possible to render a wide variety of organic liquid resin compositions thixotropic by incorporating therein from 0.5% to 5.0% by weight, based on the weight of the liquid resin composition, of any of the the herein-described amorphous, alkaline earth metal-containing aerogels having an average particle size of between 2 and 4 microns. For example, liquid coating compositions comprising solutions of high molecular weight film-formers dissolved in organic solvents may be thickened by dispersing from about 0.5% to 1.5% by weight based on the weight of the solution of such aerogels in the solution. Also certain organic liquids polymer compositions may be made thixotropic by dispersing therein from about 4.0% to 5.0% by weight, based on the weight of the liquid, of such aerogels. Such compositions are generally employed as adhesives, films, foils, lacquers, paints, stretching lacquers (dopes) and the like, and comprise solutions of high molecular weight organic film-formers such as for example nitro cellulose, cellulose acetate, chlorinated rubber, polyvinyl acetate, polyacrylic esters, cellulose butyrate, cellulose proprionate, which are dissolved in organic solvents, such as, for example, acetone, ethanol, ethyl acetate and amyl acetate.

These compositions usually contain from 40% to 50% by weight of such film-formers dissolved in an organic solvent and may often have a dispersed phase consisting of pigments or fillers, which settle out after standing for relatively short periods of time. Such settling is generally prevented by adding a small amount of the novel aerogels to these compositions. Where it is desired that the above-described liquid compositions be applied to objects in the form of a spray or a spreadable liquid, the addition of from 2.0% to 5.0% by weight (depending upon the amount of film forming materials in the composition) of the novel alkaline earth metal-containing silica aerogels to such compositions will cause them to form thixotropic gels immediately upon contact with the object to which they are applied and the compositions then will not run or drain from such objects.

It has also been found possible to thicken and/or render thixotropic, polymerizable organic liquid compositions containing polymerizable resins including, solventless varnishes and polyester resin compositions which are used in coating, filling, adhesive and laminating operations by incorporating small amounts of the novel alkaline earth metal-containing silica aerogels therein. Such compositions include liquid alkyd resins or solutions of solid alkyd or polyester resins dissolved in a solvent (for example styrene), which is usually copolymerizable with the polyester resin.

Among the compositions referred to above, which are employed in combination with the novel aerogels to form a preferred embodiment of this invention are polymerizable liquids comprising unsaturated alkyd resins. These resins are the reaction products of polyhydric alcohols, mixtures of polyhydric alcohols or mixtures of polyhydric and monohydric alcohols, and an alpha unsaturated alpha, beta carboxylic acid or a plurality of polycarboxylic acids, one of which, at least, is an unsaturated polycarboxylic acid. Examples of such polyhydric alcohols are ethylene glycol, di- and triethylene glycols, propylene glycol, tetramethylene, glycol, glycerine or pentaerythritol in combination with a monohydric alcohol, etc. Examples of unsaturated polycarboxylic acids are maleic, fumaric and itaconic acids. Anhydrides of polycarboxylic acids may also be employed. The term "polycarboxylic acid" as used herein is intended to include within its meaning the anhydrides of such acids. In addition to one or more of the unsaturated polycarboxylic acids, saturated polycarboxylic acids, may also be present in the reaction mixture of the resins referred to above. Examples of such saturated polycarboxylic acids are succinic, adipic, sebacic and phthalic acids.

In addition to the above unsaturated alkyd resins, the polymerizable liquids which may be used in the compositions of the present invention may contain polymerizable substances such as, for example, esters of unsaturated monohydric alcohols and polycarboxylic acids, including unsaturated polycarboxylic acids, halogenated aromatic polycarboxylic acids and polybasic inorganic acids. Examples of such substances are dialkyl maleate, dialkyl fumarate, dialkyl itaconate, dialkyl chlorophthalates and trialkyl phosphate and the like. Other substances which may be incorporated in these polymerizable liquids are esters of monohydric alcohols and unsaturated polycarboxylic acids which are capable of copolymerizing with unsaturated alkyd resins such as, for example, dioctyl itaconate, dibenzyl itaconate, diethyl fumarate and dibenzyl fumarate and the like.

Esters of acrylic and methacrylic acid may also be used in the present compositions. Examples of such esters are methyl, ethyl, propyl, isopropyl, butyl, isobutyl and alkyl acrylate and the corresponding esters of methacrylic acid. Vinyl monomers may also be used in such compositions including vinyl benzene, vinyl acetate, and combinations thereof, and the like.

The above-described unsaturated resins may be liquids or solids, dissolved in organic liquids, and the finely divided amorphous novel alkaline earth metal-containing silica aerogels may then be directly dispersed therein. When the unsaturated resin comprises a solid it is necessary to dissolve the resin in an organic solvent, preferably a solvent which is copolymerizable with the polyester resin, such as for example styrene.

There may also be incorporated into the above described polymerizable liquid compositions small amounts, ranging from about 0.5% to 2.0% by weight, based on the weight of the polymerizable liquid, of a polymerization catalyst. Many types of polymerization catalysts, well known to those skilled in the art, may be incorporated in the polymerizable liquid compositions of this invention including, for example, benzoylperoxide cyclo-hexanone peroxide, methyl ethyl ketone peroxide and cumene hydroperoxide, which provides the oxygen necessary to effect polymerization.

Generally speaking, when a solid polyester resin is dissolved in an organic solvent the resulting liquid will contain from 30% to 80% of the polyester resin. In one embodiment of this invention it has been found possible to prepare a thixotropic gel composition when a solution of an unsaturated polyester resin of a polyhydroxy alcohol and an unsaturated polycarboxylic acid was dissolved in 40%, based on the weight of the polyester, of styrene and 5.0 by weight of one of the aforedescribed alkaline earth metal-containing silica aerogels was dispersed therein. On the other hand when 2.0% by weight of such aerogel is dispersed in the aforementioned resin solution the viscosity of such solution is usually increased from about 850 centipoises to about 3250 centipoises at 25° C., where the viscosity measurements are made with a standard Brookfield Model RVT Synchroelectric Viscosimeter operated at 20 r.p.m. speed. The composition upon standing for 10 seconds usually becomes a solid mass which reverts to a liquid when stirred. On the other hand a 2% dispersion of silica aerogel such as described in the Kistler patent in the above composition results in a viscosity (Brookfield) of only 1580 centipoises and remains in a liquid state upon standing for over eight hours.

A further understanding of the compositions of the present invention will be obtained from the following examples which are intended to illustrate the invention but not to limit the scope thereof, parts and percentages being by weight unless otherwise specified.

*Example I*

An amorphous calcium-containing silica aerogel having siloxy groups and an average particle size of 2.9 microns, a specific surface area of 58 square meters per gram, an external surface area of 1.22 square meters per gram and wherein the calcium atoms were chemically bound to about 18% of the siloxy groups of the silica was mechanically dispersed by means of an electric stirrer in three light motor oils in the amounts indicated in the following table in which viscosity measurements were used as an index of thickening.

| Composition: | Viscosity (Brookfield) at 27° C. |
|---|---|
| SAE No. 10 motor oil | 100 |
| SAE No. 10 oil plus 1.0% calcium-containing silica aerogel | 270 |
| SAE No. 20 motor oil | 130 |
| SAE No. 20 motor oil plus 1.5% calcium-containing silica aerogel | 300 |
| SAE No. 40 motor oil | 160 |
| SAE No. 40 motor oil plus 0.5% calcium-containing silica aerogel | 320 |

The oils were significantly thickened by the dispersion therein of the calcium-containing silica aerogel, as indicated above. By way of contrast when the same amounts of silica aerogel per se or finely divided calcium silicate were added to the above oils, no appreciable thickening of the oils occurred.

*Example II*

An amorphous magnesium-containing aerogel, having siloxy groups, an average particle size of 3.9 microns, a specific surface area of 51 square meters per gram, an external surface area of 0.99 square meter per gram and wherein the magnesium atoms were chemically bound to about 26% of the siloxy groups in the aerogel was mechanically dispersed with an electric stirrer in the following lacquer compositions in the amounts indicated to provide the following film-forming resin compositions.

| Composition number | 1 | 2 | 3 |
|---|---|---|---|
| Ingredients, grams: | | | |
| Polyvinyl chloride | 15.0 | | |
| Nitrocellulose | | 13.0 | |
| Cellulose acetate | | | 7.5 |
| Ethyl acetate | 85.0 | 31.0 | 23.0 |
| Ethanol | | 36.0 | 26.0 |
| Toluol | | | 11.0 |
| Titanium dioxide | 1.5 | | |
| Castor oil | 0.3 | 1.2 | 1.1 |
| Magnesium-containing silica aerogel* | 1.0 | 1.5 | 0.75 |

*Dispersed after initial viscosity measurement.

The viscosity of the compositions were tested by measuring the seconds-bubble-rise in a Gardner tube before and after the incorporation of the magnesium-containing aerogel and the results obtained were as follows:

| Composition | Viscosity (seconds) | |
|---|---|---|
| | Initial | After aerogel dispersion |
| 1 | 4 | 240 |
| 2 | 5 | 620 |
| 3 | 4 | 450 |

In contrast, when either a silica aerogel per se or magnesium silicate was added to the foregoing composition in amounts like the amounts of the magnesium containing silica aerogel, the viscosity of the composition (e.g., seconds bubble-rise) did not exceed 40 in any instance.

*Example III*

An unsaturated polyester resin was prepared by reacting 50 mol percent of phthalic anhydride and 50 mol percent of maleic anhydride with a 25 percent molar excess of propylene glycol which excess propylene glycol was then distilled off, leaving a solid, hard, brittle, unsaturated polyester resin. A solution was prepared by dissolving 60 parts by weight of the above-described polyester in 40 parts of styrene. The calcium-containing silica aerogel and the magnesium containing aerogel described, respectively, in Examples I and II were admixed with separate portions of the above polyester resin styrene compositions in a ball mill for 1 hour in the amounts indicated below. The viscosities were measured using the method and Brookfield viscosimeter at 25° C. as hereinbefore described.

| Composition number | 1 | 2 | 3 | 4 | 5 | 6 |
|---|---|---|---|---|---|---|
| Ingredients, percent: | | | | | | |
| Polyester-styrene solution | 98.5 | 98.0 | 97.5 | 96.5 | 96.0 | 95.5 |
| Calcium-containing silica aerogel | 1.5 | 2.0 | 2.5 | | | |
| Magnesium-containing silica aerogel | | | | 3.5 | 4.0 | 4.5 |

Compositions 2, 3, 5, and 6, when allowed to stand for 15 seconds or more developed into a gel-like solid or body having the consistency of a light grease. Upon mechanical agitation, as provided by the Brookfield viscosimeter, these compositions were immediately transformed to liquids having the viscosities listed in the following table. Compositions 1 and 4 did not form solid gels upon standing.

| Composition: | Viscosity, Brookfield, at 25° C.—20 r.p.m. (centipoises) |
|---|---|
| 1 | 3000 |
| 2 | 3250 |
| 3 | 3800 |
| 4 | 3100 |
| 5 | 3350 |
| 6 | 3700 |
| Polyester-styrene solution per se | 850 |

When the above polyester-styrene solution was formulated into compositions wherein the alkaline earth metal-containing aerogels were replaced with like amounts by weight of calcium silicate, magnesium silicate, or a silica aerogel per se, the viscosity of such compositions did not exceed 1000 centipoises in any instance nor did any composition form a thixotropic gel.

*Example IV*

The following liquid resin compositions were prepared by mixing the amounts of the various ingredients as indicated.

| Composition number | 1 | 2 | 3 | 4 | 5 |
|---|---|---|---|---|---|
| Ingredients, parts by weight: | | | | | |
| Glyceryl tris cyclohexyl maleate | 30.0 | 20.0 | | | 35.0 |
| Dialkyl phthalate | 30.0 | 20.0 | | | 18.0 |
| Tertiary butyl perbenzoate | 0.6 | 0.4 | 0.2 | 0.4 | 0.6 |
| Vinyl acetate-chloride copolymer | | 20.0 | | | 20.0 |
| Dicarboxylated castor oil | | | 14.0 | 24.0 | |
| Butyl methacrylate monomer | | 9.0 | | | 14.8 |

The above compositions were highly fluid and drained readily from glass rods that were dip coated therewith. When 3% of the calcium-containing silica aerogel described in Example I was stirred into a portion of each of the above compositions the resulting mixture became highly thixotropic and glass rods which were dip coated with these compositions exhibited no drainage. When 4% of the magnesium-containing silica aerogel described in Example II was stirred into a portion of each of the above five compositions they became highly thixotropic and glass rods dip coated with such compositions exhibited no drainage. However, when 5% calcium silicate, 5% magnesium silicate or 5% of a silica aerogel per se was stirred into the above compositions, and glass rods were subsequently dip coated therewith, considerable drainage occurred in a manner similar to that of the original resin compositions.

Generally stated, the amorphous alkaline earth metal-containing silica aerogels which are used to thicken organic liquids in accordance with the present invention differ not only in ability to thicken organic liquids generally, but also in a number of other important respects, from the previously known silica aerogels per se, such as those described by Kistler, Marshall, or White. Such previously known aerogels generally have an average particle size of from 5 to 9 microns and a particle size distribution of from 2 to 10 microns. On the other hand the alkaline earth metal-containing silica aerogels of the present invention have an average particle size of from about 2 to about 4 microns and generally do not contain any particles having a size greater than 4 microns.

The novel aerogels, described herein, and processes of preparing same, are described and claimed in my co-pending application Serial No. 68,354, filed November 10, 1960.

What is claimed is:

1. A composition comprising an organic liquid and an amount, sufficient to increase the viscosity of said liquid, of a finely divided, amorphous, alkaline earth metal-containing silica aerogel comprising a silica polymer having siloxy groups and containing an alkaline earth metal, selected from the group consisting of calcium and magnesium, chemically bound to a portion of said siloxy groups in said aerogel, said aerogel being further characterized in having an $SiO_2$ to M ratio of from about 5:1 to about 66:1, wherein M is said alkaline earth metal.

2. A composition comprising an organic liquid and an amount, sufficient to thicken said liquid, of a finely divided, amorphorus alkaline earth metal-containing silica aerogel comprising a silica polymer having siloxy groups, said aerogel being characterized in having an average particle size of between 2 and 4 microns and a specific surface area of from about 10 to about 200 square meters per gram and containing an alkaline earth metal, selected from the group consisting of calcium and magnesium, chemically bound to from about 3% to about 40% of said siloxy groups in said aerogel, said aerogel being further characterized in having an $SiO_2$ to M ratio of from about 5:1 to 66:1, wherein M is said alkaline earth metal.

3. A composition as in claim 2 wherein the organic liquid is a solution of an organic high molecular weight film-forming compound dissolved in an organic solvent.

4. A composition as in claim 2 wherein the organic liquid is an organic liquid having dissolved therein an unsaturated solid alkyd resin of a polyhydroxy alcohol and an unsaturated polycarboxylic acid, said liquid being polymerizable with said resin.

5. A composition as in claim 2 wherein the organic liquid is a polymerizable liquid comprising an unsaturated alkyd resin obtained by the esterification of a mixture of ingredients comprising a polyhydric alcohol and an alpha unsaturated alpha, beta carboxylic acid.

6. A composition comprising (1) a polymerizable liquid consisting of an unsaturated solid polyester resin of a polyhydroxy alcohol and an unsaturated polycarboxylic acid, dissolved in an organic solvent and (2) an amount sufficient to render said composition thixotropic, of a finely divided, amorphous calcium-containing silica aerogel comprising a silica polymer having siloxy groups and containing calcium atoms chemically bound to from 9% to 28% of said siloxy groups in said aerogel, said aerogel being characterized in having a specific surface area of from 50 to 175 square meters per gram, an external surface area of from 0.9 to 1.6 square meters per gram, and an average particle size of from 2 to 4 microns, said aerogel being further characterized in having an $SiO_2$ to Ca ratio of from about 7 to about 22 molecules of $SiO_2$ for each atom of calcium in said aerogel.

7. A composition comprising (1) a polymerizable liquid consisting of an unsaturated solid polyester resin of a polyhydroxy alcohol and an unsaturated polycarboxylic acid, dissolved in an organic solvent and (2) an amount, sufficient to render said composition thixotropic, of a finely divided, amorphous, magnesium-containing silica aerogel comprising a silica polymer having siloxy groups and magnesium atoms chemically bound to from 12% to 26% of the siloxy groups in said aerogel, said aerogel being characterized in having a specific surface area of from 10 to 200 square meters per gram, an external surface area of from 0.9 to 1.1 square meters per gram and an average particle size in the range of from about 3 to 4 microns; said silica aerogel being further characterized in having an $SiO_2$:Mg ratio of about 6 to about 13 molecules of $SiO_2$ per atom of magnesium in said aerogel.

8. A thixotropic composition comprising (1) a solution of an unsaturated solid polyester resin of a polyhydroxy alcohol and an unsaturated polycarboxylic acid dissolved in from between about 20% and about 70%, based on the weight of the polyester resin, of styrene and (2) from about 0.5% to 5.0% by weight, based on the weight of said solution, of a finely divided amorphous calcium-containing silica aerogel comprising a silica polymer having siloxy groups and containing calcium atoms chemically bound to from 16% to 20% of the siloxy groups in said aerogel, said aerogel being characterized in having a specific surface area of from 50 to 175 square meters per gram, an external surface area of from 1.1 to 1.3 square meters per gram, an average particle size of from 2.5 to 3.5 microns, said aerogel being further characterized in having an $SiO_2$ to Ca ratio of from about 10 to about 12 molecules of $SiO_2$ for each atom of calcium in said aerogel.

9. A composition comprising (1) a polymerizable liquid consisting of a solution in styrene of an unsaturated solid polyester resin, formed by the reaction of a 25% molar excess of propylene glycol with a mixture of equal mole percentages of maleic anhydride and phthalic anhydride and having no excess propylene glycol and (2) an amount, sufficient to make said solution thixotropic, of a finely divided, amorphous, alkaline earth metal-containing silica aerogel comprising a silica polymer having siloxy groups, said aerogel being characterized in having an average particle size of between 2 and 4 microns and a specific surface area of from about 10 to about 200 square meters per gram and containing an alkaline earth metal selected from the group consisting of calcium and magnesium chemically bound to from about 3% to about 40% of the said siloxy groups in said aerogel; said aerogel being further characterized in having an $SiO_2$ to M ratio of from about 5:1 to about 66:1, wherein M is said alkaline earth metal.

10. A composition comprising (1) a polymerizable liquid consisting of a liquid unsaturated alkyd resin obtained by the esterification of a mixture comprising a polyhydric alcohol and an alpha unsaturated alpha, beta, polycarboxylic acid, and (2) an amount, sufficient to render said composition thixotropic, of a finely divided amorphous calcium-containing silica aerogel comprising a silica polymer having siloxy groups and containing calcium atoms chemically bound to from 9% to 28% of said siloxy groups in said aerogel, said aerogel being characterized in having a specific surface area of from 50 to 175 square meters per gram, an external surface area of from 0.9 to 1.6 square meters per gram, an average particle size of from 2 to 4 microns, said aerogel being further characterized in having an $SiO_2$ to Ca ratio of from about 7 to about 22 molecules of $SiO_2$ for each of calcium in said aerogel.

11. A composition as in claim 10 wherein the polymerizable liquid is a liquid unsaturated alkyd resin obtained by the esterification of a mixture comprising a polyhydric alcohol and an alpha unsaturated alpha, beta polycarboxylic acid and an ester of a monohydric alcohol and an unsaturated polycarboxylic acid capable of copolymerizing with said unsaturated alkyd resin.

12. A composition as in claim 10 wherein the polymerizable fluid comprises liquid diethylene glycol maleate obtained by the esterification of a mixture comprising diethylene glycol, maleic anhydride and a dialkyl phthalate.

13. The composition of claim 10 wherein the polymerizable liquid comprises liquid diethylene glycol maleate obtained by the esterification of a mixture comprising diethylene glycol, maleic anhydride and a polymerizable ester of an unsaturated monohydric alcohol and polycarboxylic acid.

14. A composition comprising (1) a polymerizable liquid consisting essentially of a liquid unsaturated alkyd resin obtained by the esterification of a mixture comprising a polyhydric alcohol and an alpha unsaturated alpha, beta polycarboxylic acid and (2) from about 0.5% to 5.0% by weight, based on the weight of the polymerizable liquid, of an amorphous, finely divided, alkaline earth, metal-containing silica aerogel comprising polymer having siloxy groups, said aerogel being characterized in having a particle size of between 2 and 4 microns, and a specific surface area of from about 10 to about 200 square meters per gram and containing an alkaline earth metal, selected from the group consisting of calcium and magnesium, chemically bound to from about 3% to about 40% of the said siloxy groups in said aerogel, said aerogel being further characterized in having an $SiO_2$ to M ratio of from about 5:1 to about 66:1, wherein M is said alkaline earth metal.

15. A composition comprising (1) an oleaginous liquid and (2) an amount sufficient to thicken said liquid of a finely divided, amorphous, alkaline earth metal-containing silica aerogel comprising a silica polymer having siloxy groups, an average particle size of between 2 and 4 microns and a specific surface area of from about 10 to about 200 square meters per gram and containing an alkaline earth metal selected from the group consisting of calcium and magnesium, chemically bound to from about 3% to about 40% of said siloxy groups in said aerogel, said aerogel being further characterized in having an $SiO_2$ to M ratio of from about 5:1 to about 66:1, wherein M is said alkaline earth metal.

16. A composition as in claim 15 wherein the organic liquid is a hydrocarbon lubricating oil and said aerogel is employed in an amount sufficient to thicken said oil to a grease consistency.

17. A lubricating grease comprising a hydrocarbon lubricating oil and an amount, sufficient to thicken said oil to a grease consistency of a finely divided, amorphous, calcium-containing silica aerogel comprising a silica polymer having siloxy groups and containing calcium atoms chemically bound to from 9% to 28% of said siloxy groups in said aerogel, said aerogel being characterized in having an $SiO_2$ to Ca ratio of from about 7 to about 22 molecules of $SiO_2$ for each atom of calcium in said aerogel, and having an average particle size of about 2 to about 4 microns.

References Cited in the file of this patent

UNITED STATES PATENTS

| | | |
|---|---|---|
| 2,203,614 | Goodwin | June 4, 1940 |
| 2,285,449 | Marshall | June 9, 1942 |
| 2,583,605 | Sirianni et al. | Jan. 29, 1952 |
| 2,610,959 | Norlander | Sept. 16, 1952 |
| 2,656,315 | Eckert | Oct. 20, 1953 |
| 2,887,461 | Hort | May 19, 1959 |
| 2,948,701 | Baker | Aug. 9, 1960 |

FOREIGN PATENTS

| | | |
|---|---|---|
| 697,670 | Great Britain | Sept. 30, 1953 |
| 833,607 | Great Britain | Apr. 27, 1960 |